United States Patent
Kuhlman et al.

(10) Patent No.: US 8,277,055 B2
(45) Date of Patent: Oct. 2, 2012

(54) MULTIPLE VIEW DISPLAY SYSTEM USING A SINGLE PROJECTOR AND METHOD OF OPERATING THE SAME

(75) Inventors: Frederick F. Kuhlman, Kokomo, IN (US); Andrew P. Harbach, Kokomo, IN (US); Richard D. Parker, Tipton, IN (US); Dwadasi H. R. Sarma, Kokomo, IN (US); Marian C. Hargis, Kokomo, IN (US); Steven G. Skiver, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 131 days.

(21) Appl. No.: 12/840,526

(22) Filed: Jul. 21, 2010

(65) Prior Publication Data
US 2012/0019781 A1    Jan. 26, 2012

(51) Int. Cl.
*G03B 21/28* (2006.01)

(52) U.S. Cl. ........ 353/98; 353/11; 353/12; 353/13; 353/14; 353/15; 353/99; 353/119; 353/122

(58) Field of Classification Search .......... 353/11, 353/12, 13, 14, 15, 119, 122; 359/268, 269, 359/271, 273, 274, 267, 265, 266, 619, 629; 349/132, 141, 168, 169, 172, 177, 186; 296/70, 296/37.8; 701/1, 29, 36
See application file for complete search history.

(56) References Cited

U.S. PATENT DOCUMENTS

| | | | |
|---|---|---|---|
| 4,961,625 A * | 10/1990 | Wood et al. | 359/630 |
| 5,686,979 A | 11/1997 | Weber et al. | |
| 5,973,842 A * | 10/1999 | Spangenberg | 359/619 |
| 6,674,504 B1 | 1/2004 | Li et al. | |
| 6,715,885 B2 * | 4/2004 | Hirose et al. | 353/69 |
| 6,785,036 B1 * | 8/2004 | Berneth et al. | 359/271 |
| 6,999,649 B1 | 2/2006 | Chen et al. | |
| 7,131,728 B2 * | 11/2006 | Nambudiri et al. | 353/13 |
| 7,230,611 B2 * | 6/2007 | Bischoff | 345/175 |
| 7,629,877 B2 * | 12/2009 | Lvovskiy et al. | 340/438 |
| 7,878,664 B2 * | 2/2011 | Chan et al. | 353/98 |
| 8,045,729 B2 * | 10/2011 | Preston et al. | 381/86 |
| 2005/0057442 A1 | 3/2005 | Way | |
| 2005/0140929 A1 | 6/2005 | Nambudiri et al. | |
| 2005/0168695 A1 * | 8/2005 | Ooba et al. | 353/13 |
| 2008/0084614 A1 | 4/2008 | Dobrusskin | |
| 2009/0262145 A1 * | 10/2009 | Akita et al. | 345/679 |

FOREIGN PATENT DOCUMENTS
WO    8703385 A1    6/1987

OTHER PUBLICATIONS
U.S. Appl. No. 12/840,576, filed Jul. 21, 2010.
U.S. Appl. No. 12/852,647, filed Aug. 9, 2010.
U.S. Appl. No. 12/881,242, filed Sep. 14, 2010.
European Search Report dated May 9, 2012.

* cited by examiner

*Primary Examiner* — Georgia Y Epps
*Assistant Examiner* — Sultan Chowdhury
(74) *Attorney, Agent, or Firm* — Lawrence D. Hazelton

(57) ABSTRACT

A system and method to display a plurality of different images at multiple distinct locations using a single image projector and an image propagation control means to control a propagation pathway from the projector to a display at each location.

11 Claims, 5 Drawing Sheets

MULTIPLE VIEW DISPLAY SYSTEM USING A SINGLE PROJECTOR AND METHOD OF OPERATING THE SAME

TECHNICAL FIELD OF INVENTION

The invention generally relates to displays for displaying images or information, and more particularly relates to a system and method for use in a vehicle that uses a single projector to display different images at multiple locations.

BACKGROUND OF INVENTION

It is known to equip a vehicle with an image display having an appearance comparable to a computer display to communicate information such as vehicle speed, engine operating conditions, navigation information, entertainment system settings, or vehicle interior heating/air conditioning settings. Some of these displays use a projector to project an image onto one side of a translucent surface so the image can be viewed from the other side. Some vehicles may be equipped with more than one such display. For example, a vehicle may have one display located where the instrument panel is typically located for displaying vehicle operating conditions such as vehicle speed, and a second display located near the center of the vehicle dash for displaying entertainment system information. Also, there is a desire for vehicle displays having high width over height aspect ratios that may require using more than one projector. Also, there is a desire to reduce overall costs of displays.

SUMMARY OF THE INVENTION

Described herein is a multiple view display system that uses a single projector to project different images to multiple locations. The projected images are time-multiplexed and controlled by an image propagation control means to provide multiple displays.

In accordance with one embodiment of this invention, a system to display a plurality of different images at a plurality of locations is provided. The system includes an image projector and an image propagation control means. The image projector is configured to project each image during a distinct time period. The image propagation control means is configured to control a propagation pathway from the projector to each location in accordance with the image output by the image projector.

In another embodiment of the present invention, a method for displaying a plurality of different images at a plurality of locations provided. The method includes the step of projecting each image during a distinct time period by an image projector. The method also includes the step of controlling a propagation pathway from the projector to each location in accordance with the image output by the image projector. The method also includes the step of displaying each image at each location.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
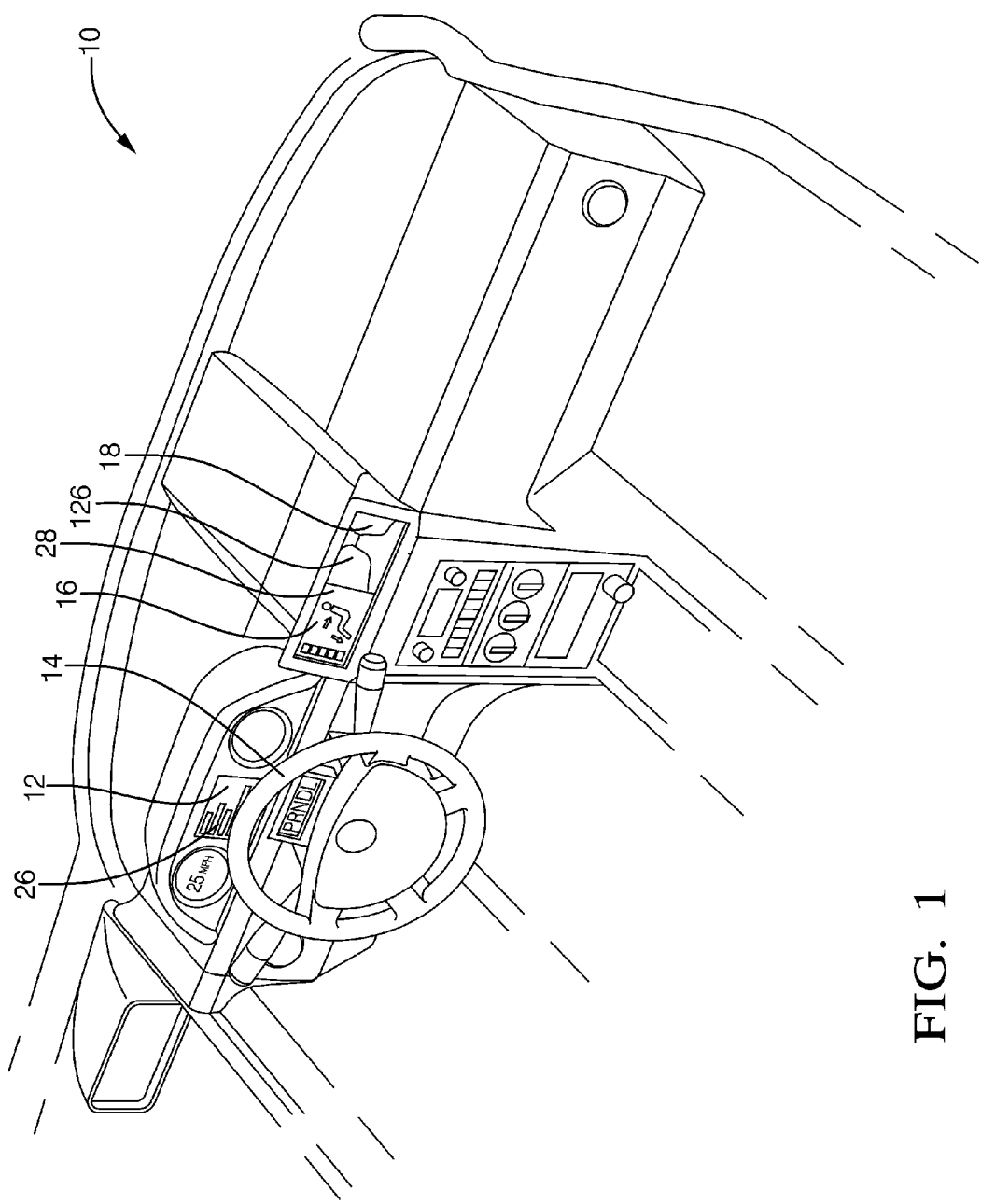
FIG. 1 is a cut-away view of an automobile interior equipped with a multiple view display system in accordance with one embodiment.

In accordance with an embodiment of a multiple view display system 10 to display a plurality of different images at a plurality of different locations, FIG. 1 illustrates a non-limiting example of an automobile interior having a first display 12 at a first location 26, for example located near a steering wheel 14 where an instrument panel is typically located to display vehicle operation information such as vehicle speed is typically located. A display at the first location 26 provides a view of an image readily viewed by a vehicle operator (not shown). The interior may also include a second display 16 at a second location 28, for example near the center of the dash where other information is typically found such as entertainment system information or heating/air-conditioning/ventilation control (HVAC) information. A display at the second location 28 provides a view of an image readily viewed by other passengers in the vehicle (not shown). Such displays may be readily reconfigured to display other kinds of information such as navigation information. It will be appreciated that the system 10 could also be useful in other vehicles such as aircraft, boats, and construction equipment. Also, the system 10 could be used in non-vehicle environments such as a manufacturing control center where multiple displays are desired to display information about different machines or processes, or a hospital where multiple displays are desired to display information about different patients. It is understood that such a system could also be used to display the same image at multiple locations.

It will be appreciated by those skilled in the art that the system 10 could be used to project multiple images in a conference room or retail store so that multiple images could be viewed using a single projector. Individual image signals may come from separate inputs, such as separate laptop computers so that two images on separate projection screens can be readily compared by a person viewing the images. Another useful example is a two sided monitor that shows images on opposite sides of the monitor. Such a monitor may be useful for a customer service desk or a doctor's office so the customer could easily view the same or different image as the doctor or customer service agent.

Figure 2:
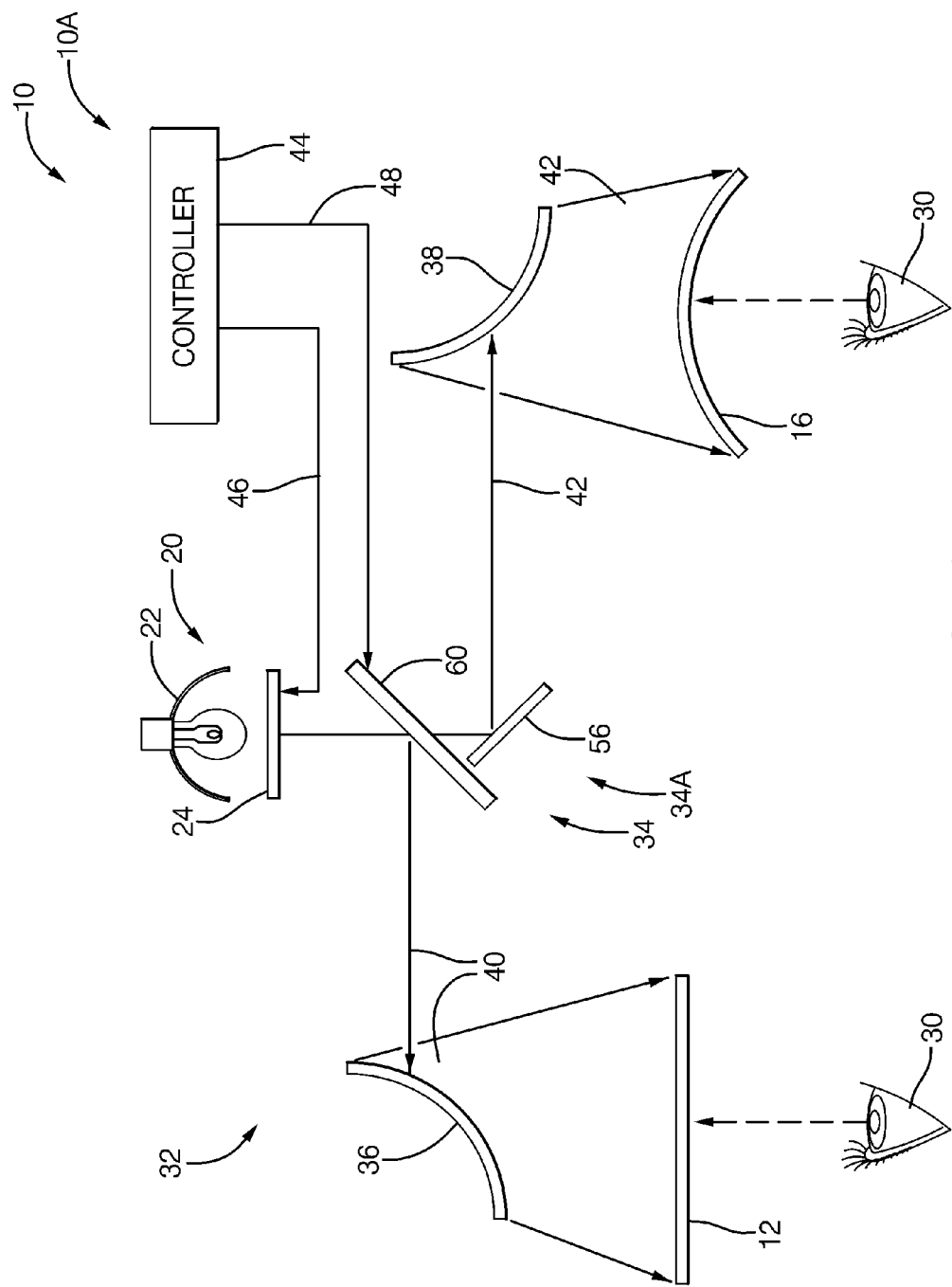
FIG. 2 is a diagram of a multiple view display system in accordance with one embodiment.
Figure 3:
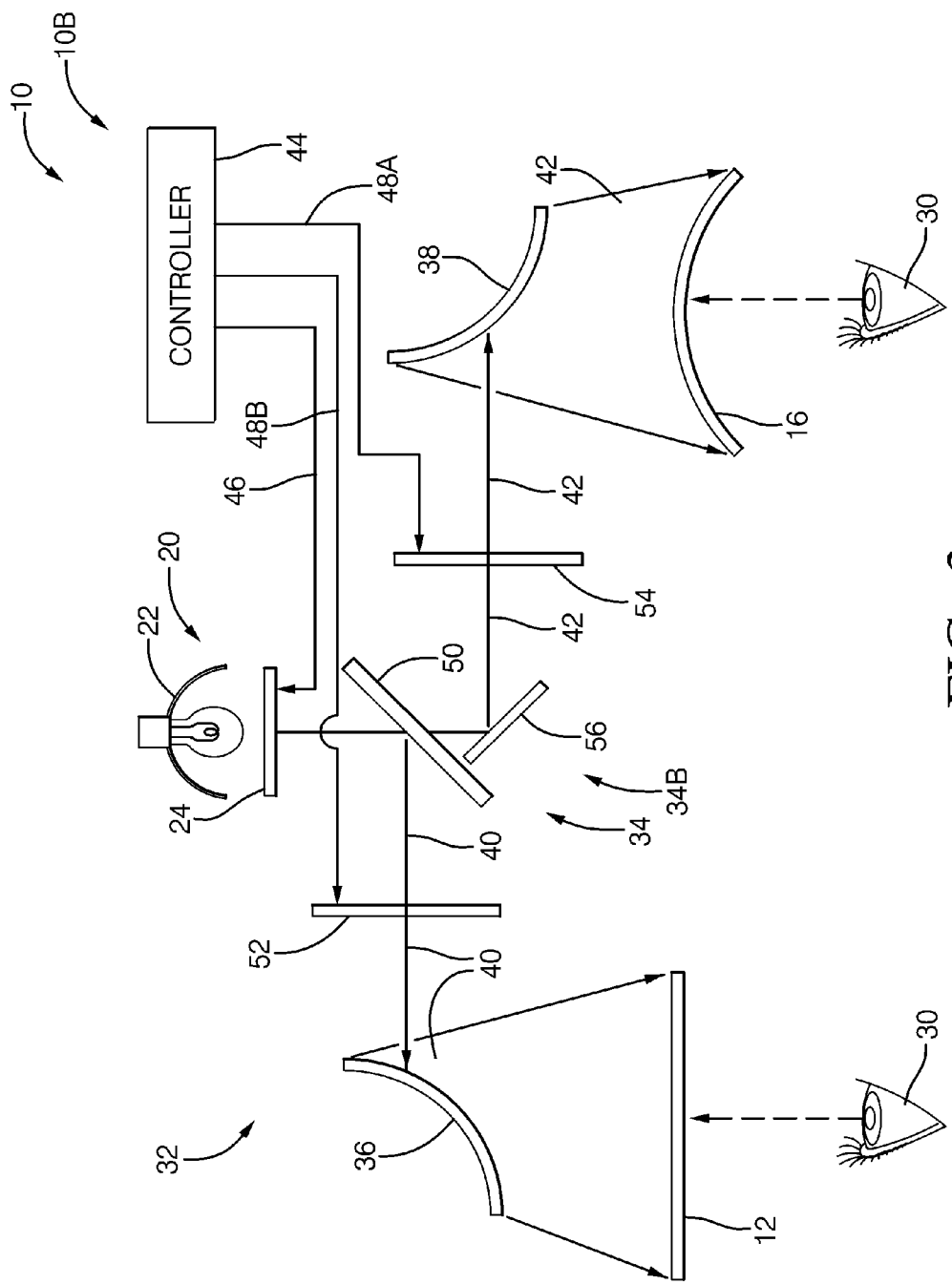
FIG. 3 is a diagram of a multiple view display system in accordance with one embodiment.
Figure 4:
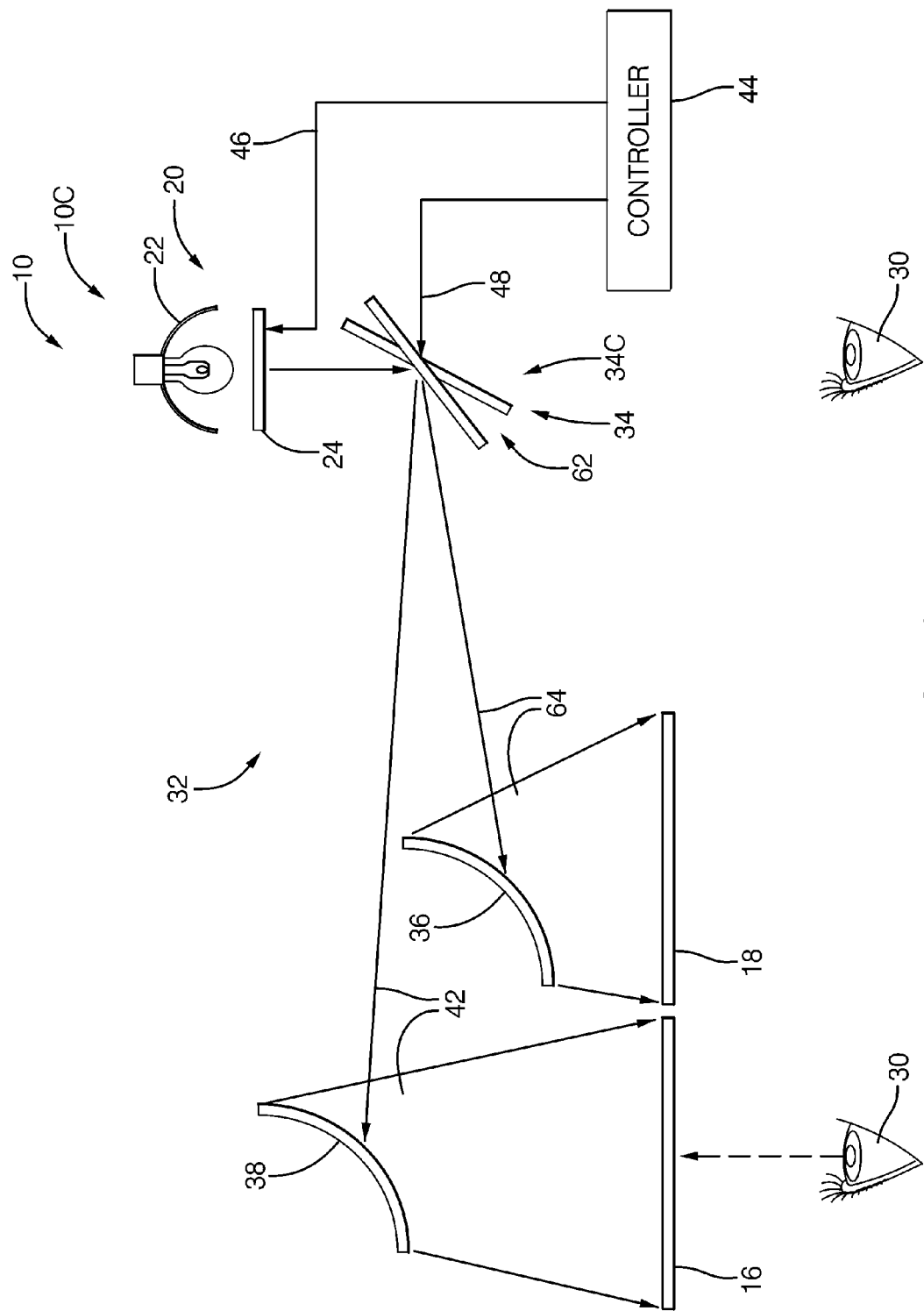
FIG. 4 is a diagram of a multiple view display system in accordance with one embodiment.

In general, the system 10 described herein uses projection type displays to display information. FIGS. 2-4 illustrate non-limiting examples of systems 10A, 10B, and 10C, respectively. A single image projector 20 is provided that generally includes a light source 22, such as a light emitting diode (LED) or incandescent bulb, and an imaging device 24 through which light from the light source 22 passes to project an image. The image projector 20 may also include one or more lenses (not shown) to focus the image projected. A person of ordinary skill will recognize that the components necessary to make the image projector 20 are readily available from various suppliers. It will be appreciated that the specific configuration shown is only for the purposes of explanation, and that other image projector configurations are known that could be substituted for the configuration illustrated.

The imaging device 24 is selected to have an image frame update rate or refresh rate sufficient for time-multiplexing of images. The time-multiplexed images may have the same refresh rate, or may have different refresh rates based on the dynamic content of the images. For example, if the imaging device 24 has a refresh rate of 90 Hz, then the first display 12 may refresh at 60 Hz and the second display 16 may refresh at 30 Hz. Otherwise the system 10 may be configured to refresh each display at 45 Hz. Also, if the system 10 had three displays, each display may be refreshed at 30 Hz. Furthermore, the imaging device 24 may have a "blank" time period which would provide a time period for other hardware in the system 10 to change states as described below.

The image projector 20 outputs or projects an image onto a surface so that the image can be viewed by a person (not shown). When such systems are installed in vehicles, images are typically projected onto one side of displays formed of translucent material such as frosted glass or the like, so the image may be viewed by a person from the other side, as suggested by an illustration of eyes 30 observing the displays 12 and 16. Also as suggested by the illustration, displays 12 and 16 may be curved, flat, or any other shape suitable for displaying the image projected on the display. Alternately, in non-vehicle environments, the images may be projected on a wall or display screen such that viewer is on the same side of the display surface as the projector.

The system 10 projects and displays distinct images at different locations (e.g. locations 26, 28) by time-multiplexing alternating frames of the distinct images projected by the single image projector 20 so that each image is output during a distinct time period. Then, the propagation pathway that the light pattern forming the image output by the projector 20 travels to each location is controlled by an image propagation control (IPC) means 32. In general, the IPC means 32 controls propagation of the images by reflecting the images along different propagation pathways or selectively blocking a propagation pathway to prevent an image from propagating. Non-limiting examples of the IPC means 32 are illustrated in FIGS. 2-4. As such, the IPC means 32 may be configured to control propagation of each image toward each location in accordance with the image output by the image projector 20.

Referring to FIG. 1, the system is illustrated as having the first display 12 a the first location 26, and the second display at the second location 28, which is spaced apart from the first location 26. Alternately, the system 10 may have an alternate first location such as a third location 126 adjacent the second location 28 where a third display 18 may be located in addition to, or instead of, the first display 12. Placing displays in adjacent locations may be useful to display an image having, for example, an width to height aspect ratio that is greater (i.e.—wider) than is typical for a single image from a single projector that is not time-multiplexing images to multiple locations as described herein.

In general, the IPC control means 32 may include a minor assembly 34 configured to direct a first image toward a first location (e.g. –26 or 126) during a first time period, and direct a second image toward a second location (28) distinct from the first location during a second time period distinct from the first time period, as will be explained in more detail below. The IPC means 32 may include a first mirror 36 arranged along a first propagation pathway 40 to reflect the first image toward the first display 12 or the third display 18. The IPC means 32 may also include a second minor 38 arranged along a second propagation pathway 42 to reflect the second image toward the second display 16. The mirrors 36, 38 are illustrated as being convex. Alternatively, the mirrors 36, 38 may be flat or any other shape useful to reflect an image toward a display. It is understood that the mirrors 36, 38 are included for the purposes of explanation, and not necessarily required components of the IPC means 32. It will be appreciated that the IPC means described herein may also be used to direct more than two images to more than two locations and thereby provide multiple view display systems 10 with more than two displays.

The system 10 may include a controller 44 adapted to provide an image control signal 46 for controlling the time-multiplexing of images projected by the projector 20. The controller 44 may also be adapted to provide a projection control signal 48 for controlling various devices in the IPC means 32 in coordination with the images being projected by the projector 20. The controller 44 may include a processor such as a microprocessor or other control circuitry as should be evident to those in the art. The controller 44 may include memory, including non-volatile memory, such as electrically erasable programmable read-only memory (EEPROM) for storing one or more routines, thresholds and captured data. The one or more routines may be executed by the processor to perform steps for providing signal 46 and 48 as described herein.

FIG. 2 illustrates a mirror assembly 34A as a non-limiting example of part of the IPC means 32. In this embodiment, the minor assembly 34A includes an electrically switchable transreflective mirror (ESTM) 60. The ESTM is a known device available from Kent Optronics that is operable to a reflection state whereby light impinging on the ESTM is reflected in one direction, and operable to a transparent state whereby light passes though the ESTM in another direction. As illustrated in FIG. 2, the ESTM 60 is arranged in the minor assembly 34A to reflect the first image along the first image pathway 40 toward the first display 12 at the first location 26 when the ESTM 60 is operated to the reflection state. The ESTM 60 is also arranged to pass the second image along the second pathway 42 toward the second display 16 at the second location 28 when the ESTM 60 is operated to the transparent state.

FIG. 3 illustrates a minor assembly 34B as a non-limiting example of part of the IPC means 32. In this embodiment, the mirror assembly 34B includes a beam splitter 50. The beam splitter 50 is a known device, typically formed of plate glass having a metallic coating, such as silver, that generally reflects a portion of light impinging on the beam splitter 50, and simultaneously generally passes the remaining light such that the same image is present along two distinct pathways. The minor assembly 34B may also include a first shutter device 52 and a second shutter device 54. In general, the shutter devices 52 and 54 are operable to an obstruction state whereby light is prevented from propagating along a pathway through the shutter, and operable to a transparent state whereby the shutter allows light to pass though the shutter. A controller 44 may be included to provide a first shutter control signal 48A to the first shutter device 52, and a second shutter control signal 48B to the second shutter device 54. The shutter control signals 48A and 48B are generally coordinated with the image control signal 46 so the desired images are displayed on the desired displays. In one embodiment the first shutter device 52 may be a first liquid crystal device (LCD) and/or the second shutter device may be a second LCD device. Alternatively, either shutter device 52, 54 may be a mechanical type shutter device.

The arrangement of the minor assembly 34B is such that during a first time period the beam splitter 50 simultaneously directs a first image along the first pathway 40 toward the first display 12 at the first location 26, and along the second pathway 42 toward the second display 16 at the second location 28. During this first time period, the first shutter device 52 may be operated by the controller 44 to the transparent state so the first image passes to first display 12 at the first location 26 during the first time period, and the second shutter device 54 may be operated by the controller 44 to the obstruction state to prevent the first image from being displayed on the second display 16 at the second location 28. Similarly, during a second time period the beam splitter 50 simultaneously directs a first image along the first pathway 40 and the second pathway 42. However, during this second time period, the first shutter device 52 is operated to the obstruction state to prevent the first image from being displayed on the first display 12, and the second shutter device 54 is operated to the transparent state so the second image is displayed on the second display 16.

FIG. 4 illustrates a mirror assembly 34C as a non-limiting example of part of the IPC means 32. In this embodiment, the mirror assembly 34C includes an adjustable minor 62 that is movable to a first position to reflect the first image along a third image pathway 64 toward a third display 18 at a third location 126, and a second position to reflect the second image along a second pathway 42 toward as second display 16 in the second location 28. The displays 16, 18 are illustrated as being adjacent to each other so that a composite display may be formed whereby displays 16, 18 are perceived as a single unified display. Such an arrangement may be useful to provide a display having an aspect ratio that is not readily available from a single projector projecting a single image. It will be appreciated that the arrangement of the adjustable mirror 62 could be used to project images to display that are not adjacent such as illustrated in FIGS. 2 and 3. It will also be appreciated that the mirror assemblies 34A and 34B could be used to project images to the adjacent displays 16 and 18 illustrated in FIG. 4.

The adjustable minor 62 may be moved by a piezoelectric actuator (not shown) or an electromagnetic actuator (not shown) as should be evident to those in the art. Alternatively, the adjustable mirror may be mirrors arranged on a rotating disk so that as each mirror rotates into position, the desired image is projected so that the image appears at the desired display. The adjustable minor 62 is illustrated as a single element type minor, however, in one embodiment the adjustable minor may be a digital light processing (DLP) device formed of an array of mirror elements configured to reflect the first image toward the first location, and reflect the second image toward the second location. DLP devices are available from Texas Instruments. The DLP device may also be known as a digital micro-minor device (DMD).

Figure 5:
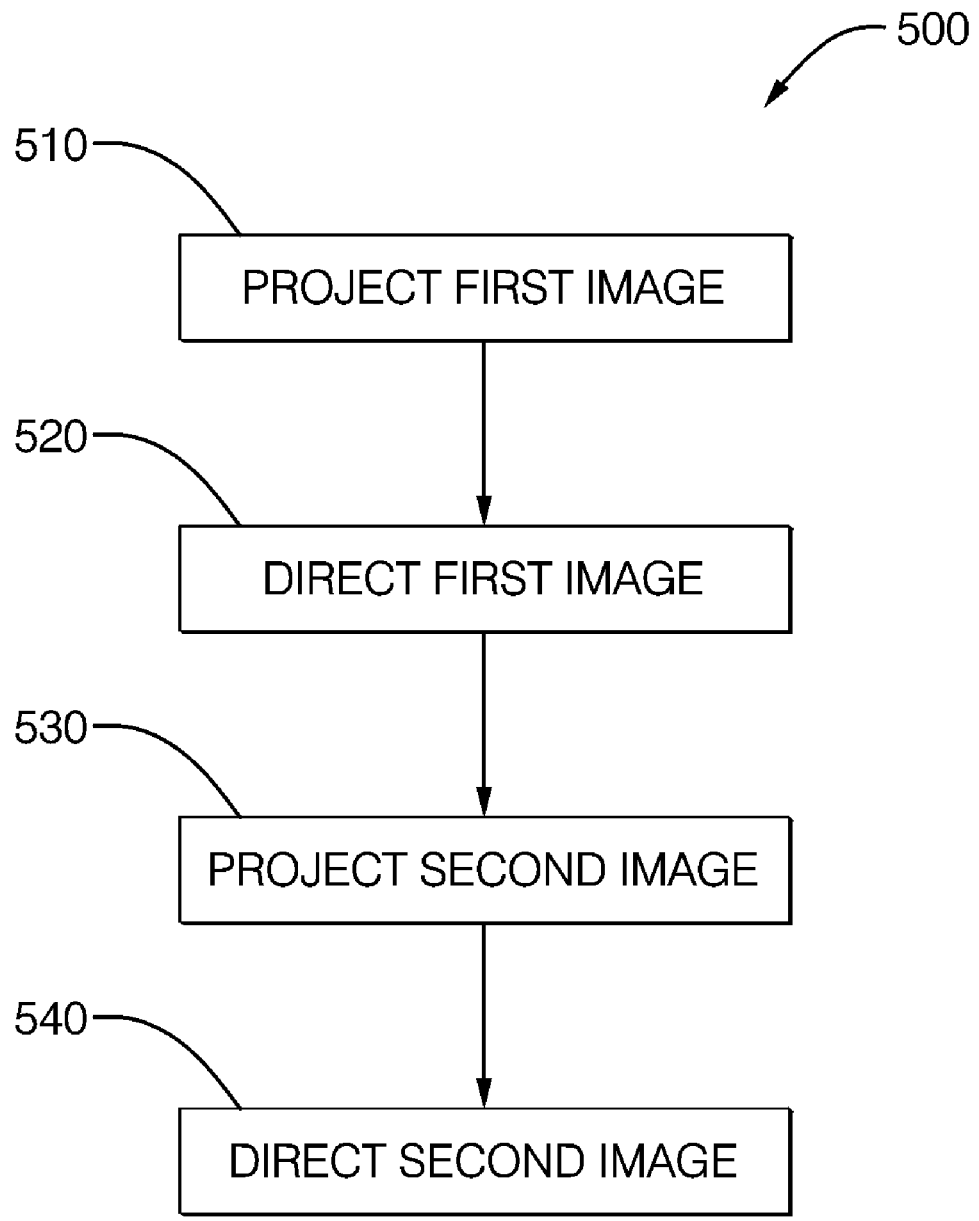
FIG. 5 is a flowchart of a method to operate a multiple view display system in accordance with one embodiment.

FIG. 5 illustrates a method 500 for displaying a plurality of different images at a plurality of locations by projecting each image during a distinct time period by an image projector 20, and controlling a propagation pathway from the projector to each location in accordance with the image output by the image projector 20. At step 510, PROJECT FIRST IMAGE, the image projector 20 projects a first image during a first time period. At step 520, DIRECT FIRST IMAGE, the image projected by the projector during the first time period may be directed by an image pathway control (IPC) means 32 toward a first display 12 at a first location 26. At step 530, PROJECT SECOND, the image projector 20 projects a second image during a second time period. At step 540, DIRECT SECOND IMAGE, the image projected by the image projector 20 during the second time period may be directed by the IPC means 32 toward a second display 16 at a second location 28. The method 500 may further include steps to project a third image during a third time period toward a third display. The method 500 may be repeated on a periodic basis such as 30 times per second so that the images appearing on each display appear constant and do not appear to flicker.

Accordingly, a system 10 and a method 500 of to display a plurality of different images at a plurality of locations using a single projector is provided. By using a single image projector 20 combined with an image projection control means 32 such as described herein, the cost of providing multiple displays can be reduced when compared to multiple display systems having separate imaging devices for each display.

While this invention has been described in terms of the preferred embodiments thereof, it is not intended to be so limited, but rather only to the extent set forth in the claims that follow.

We claim:

1. A system to display a plurality of different images at a plurality of locations, said system comprising:
    an image projector configured to project a first image during a first time period, and project a second image distinct from the first image during a second time period distinct from the first time period; and
    an image propagation control means configured to control a propagation pathway from the projector to each location in accordance with the image output by the image projector, wherein the image propagation control means comprises an electrically switchable transreflective minor (ESTM) operable to a reflection state and a transparent state, wherein the ESTM is configured to reflect the first image toward the first location during the first time period when the ESTM is operated to a reflection state, and pass the second image toward the second location during the second time period when the ESTM is operated to a transparent state.

2. The system in accordance with claim 1, wherein the system is installed in a vehicle.

3. The system in accordance with claim 1, wherein the system further comprises a display at each location configured to display the image projected to the location.

4. A system to display a plurality of different images at a plurality of locations, said system comprising:
    an image projector configured to project a first image during a first time period, and project a second image distinct from the first image during a second time period distinct from the first time period; and
    an image propagation control means configured to control a propagation pathway from the projector to each location in accordance with the image output by the image projector, wherein the image propagation control means comprises a beam splitter, a first shutter device, and a second shutter device distinct from the first shutter device,
    wherein the beam splitter is configured to simultaneously direct a first image toward a first location and a second location distinct from the first location during a first time period, and simultaneously direct a second image toward the first location and the second location during a second time period distinct from the first time period,
    wherein the first shutter device is configured to pass the first image to the first location during the first time period, and block the second image during the second time period, and
    wherein the second shutter device is configured to pass the second image to the second location during the second time period, and block the first image during the first time period.

5. The system in accordance with claim 4, wherein the first shutter device comprises a first liquid crystal device (LCD), and the second shutter device comprises a second LCD device.

6. The system in accordance with claim 1, wherein the plurality of locations comprises a first location spaced apart from a second location.

7. The system in accordance with claim 1, wherein the plurality of locations comprises a first location adjacent a second location.

8. The system in accordance with claim 4, wherein the system is installed in a vehicle.

9. The system in accordance with claim 4, wherein the system further comprises a display at each location configured to display the image projected to the location.

10. The system in accordance with claim 4, wherein the plurality of locations comprises a first location spaced apart from a second location.

11. The system in accordance with claim 4, wherein the plurality of locations comprises a first location adjacent a second location.

* * * * *